US012024981B1

(12) United States Patent
Yusuf

(10) Patent No.: US 12,024,981 B1
(45) Date of Patent: Jul. 2, 2024

(54) DIRECT DRIVE CONNECTOR SLEEVE

(71) Applicant: Osman Yusuf, Hollywood Park, TX (US)

(72) Inventor: Osman Yusuf, Hollywood Park, TX (US)

( * ) Notice: Subject to any disclaimer, the term of this patent is extended or adjusted under 35 U.S.C. 154(b) by 462 days.

(21) Appl. No.: 17/199,837

(22) Filed: Mar. 12, 2021

(51) Int. Cl.
  *E21B 1/38* (2006.01)
  *E21B 4/06* (2006.01)
  *F16L 21/06* (2006.01)
  *F16L 55/172* (2006.01)

(52) U.S. Cl.
  CPC .............. *E21B 4/06* (2013.01); *F16L 21/06* (2013.01); *F16L 55/172* (2013.01)

(58) Field of Classification Search
  CPC .......... E21B 10/36; E21B 10/40; E21B 10/38; E21B 1/00; E21B 1/04; E21B 1/02; E21B 1/12; E21B 1/14; E21B 1/16; E21B 1/18; E21B 1/20; E21B 1/22; E21B 1/24; E21B 1/26; E21B 1/30; E21B 1/28; E21B 1/32; E21B 1/38
  See application file for complete search history.

(56) References Cited

U.S. PATENT DOCUMENTS

| | | | | |
|---|---|---|---|---|
| 1,441,846 A * | 1/1923 | Gilman | ................. | E21B 19/086 173/156 |
| 1,739,141 A * | 12/1929 | Hansen | ................... | E21B 21/01 285/190 |
| 2,897,016 A * | 7/1959 | Baker | ................... | E21B 17/105 175/325.6 |
| 3,054,646 A * | 9/1962 | Minor | ................... | E21B 17/105 175/325.6 |
| 4,176,986 A * | 12/1979 | Taft | ....................... | E21B 17/012 405/195.1 |
| 4,398,772 A * | 8/1983 | Odell | .................... | E21B 17/105 175/325.6 |
| 4,463,602 A * | 8/1984 | Stoddard | ............... | E21B 25/005 73/152.16 |
| 5,901,798 A * | 5/1999 | Herrera | ............... | E21B 17/1064 166/241.3 |
| 7,117,939 B1 * | 10/2006 | Hawley | ................. | E21B 17/076 166/99 |
| 2004/0145970 A1 * | 7/2004 | Dopf | ....................... | E21B 47/16 340/856.3 |
| 2011/0114338 A1 * | 5/2011 | Casassa | ............. | E21B 17/1078 166/241.1 |

OTHER PUBLICATIONS

Elesa, "Ball spring plungers," 1 p., publication date unknown.
Elesa, "Bolt spring plungers," 1 p., publication date unknown.

\* cited by examiner

*Primary Examiner* — Kipp C Wallace
(74) *Attorney, Agent, or Firm* — Law Office of Sam Sokhansanj PLLC

(57) ABSTRACT

An impact hammer sleeve for oil and gas conductor operations that eliminates the need for a drive adapter. The impact hammer sleeve can include interior and exterior wall regions and a plurality of biasing members disposed within the interior wall region of the tubular sleeve, wherein the tubular sleeve is configured to receive a conductor pipe and connector therein. Here, the tubular sleeve can help centralize and secure a hammer atop the conductor pipe and connector while maintaining an adequate sleeve gap via the plurality of biasing members, among other advantages.

9 Claims, 10 Drawing Sheets

DIRECT DRIVE CONNECTOR SLEEVE

BACKGROUND

This section is intended to introduce the reader to aspects of art that may be related to various aspects of the present disclosure described herein, which are described and/or claimed below. This discussion is believed to be helpful in providing the reader with background information to facilitate a bet-ter understanding of the various aspects of the present disclosure described herein. Accordingly, it should be understood that these statements are to be read in this light, and not as admissions of prior art.

During the construction of a well, particularly oil and gas wells, tubular pipe, which is also known as a joint, conductor pipe, conductor casing, casing, and/or tubing, can come in sections of about forty feet in length, which are joined together using connectors or connections via a threaded male pin end joined to a female box end in order to create a "string." A string is a long section of connected tubular pipe that is lowered into a wellbore and eventually serves as the foundation and production conduit for the well. The first and uppermost tubular string in a well is also called the conductor string, conductor casing string, conductor casing, conductor pipe or drive pipe. Furthermore, this section of the well is known as the top-hole section. Although the most common and traditional method for placing a tubular string into the earth involves drilling and creating a borehole in the earth and placing and cementing the tubular string in said borehole and earth, the first and uppermost tubular string, said top-hole section, can also be installed into the earth by other conventional methods. These conventional methods can include jetting and piling, the lad-der of which is also known as "driving."

With respect to the method of piling or driving the conductor string as the top-hole section of a well, the standard equipment employed in such an operation is an impact piling hammer (referred to herein as "hammer"). Hammers come in a variety of operating principles, for example hydraulically oper-ated or by diesel. While ham-mers can be used for piling conductor pipe, irre-spective of type or operating principle, they employ the use of an anvil and sleeve. The sleeve, which is also known as a guide, bell guide, guide sleeve, lead or leader, is a hollow cylindrical shaped apparatus or a simple section of tube, that is attached to the bottom of the hammer below the anvil and is used to guide and centralize the conductor pipe while also stabiliz-ing the hammer atop the conductor pipe or pile prior to and during the piling operation. In order for this to function properly, the inside diameter of the sleeve needs to be larger than that of the conductor pipe or the pile's outside diameter, which therefore allows the sleeve to be guided and slided over and "swallow" the conductor pipe or pile until it contacts the anvil atop the sleeve. At this point the conductor pipe and hammer are secured to one another and standard piling operations may commence.

As discussed, the sleeve inside diameter needs to be larger than that of the conductor pipe outside diameter, and special precautions must be taken for this to function properly. Firstly, there needs to be a size or air gap between the inside diameter of the sleeve and the outside diameter of the conductor pipe to reduce or eliminate friction altogether. This gap is typically one quarter of an inch in size, but in some applications can be slightly more or less, depending on the ovality or out-of-round tolerances of the conductor pipe being employed. The goal is to centralize the hammer atop the conductor pipe or pile while pre-venting any friction at all that at a minimum could diminish the energy transfer from the hammer to the pile, and in a worst case may result in the conductor pipe seizing inside the sleeve itself, which would altogether shut down the operation. On the opposite spectrum, this size or air gap also need not be too wide in size, which here at a minimum could again cause a reduction in energy transfer from the hammer to the pile due to the hammer being eccentric atop the conductor pipe or pile and therefore jumping and/or leaning laterally pre-venting clean and total circumferential contact between the anvil and top of the pile, and here in a worst case be so unstable that the hammer would lean over to one side and ultimately dislodge from the pile itself and fall over.

As discussed, conductor pipe sections employed in the construction of oil and gas wells come in sections of about forty feet in length, which are most commonly joined together using connectors or connections, which is a threaded male pin end joined to a female box end. Furthermore, connectors employed for piling applications, also known as "drivable" connectors, are available in either integral or non-integral forms. Integral connectors are con-nectors in which the threads are machined or cut directly into the pipe or tube wall itself, and non-integral connectors are threaded sections manufactured separately from the pipe or tube itself and later welded to the plain end of a conductor pipe or tube prior to being deployed to the field. Due to the nature of hammers and how they function, which involves the action of a ram striking the anvil which in turn strikes and transfers the energy onto a pile, if connectors are being employed, a connector need not be damaged after being driven with a hammer so that it can then be mated or connected properly with the next section of conductor pipe and threaded connector and maintain its structural integrity and sealing characteristics. To achieve this, some drivable connectors typically have a robust thread protector, com-monly referred to as a PDL (protec-tor/drive/lift), which serves the purpose of protecting the threads and also con-tains a shoulder for use in conjunction with a lifting device, commonly referred to as an elevator, for picking up and handling the conductor pipe. Once a section of conductor pipe is piled to depth, only then is the PDL removed so the next conductor pipe section can be mated or connected to the previous section so piling operations can re-commence. The use of PDLs are typically standard when employing flush OD (outside diameter) connectors due to their absence of a lift shoulder, and when using non-flush OD connectors there will be some form of a lifting shoulder present, upset or lip for a lifting device. Hence, all drivable connectors, whether present in the form of a PDL or fabricated directly into the connector itself, will maintain some type of lifting shoulder, groove or pad eye used for lifting while operations are in effect.

Furthermore, when employing connectors to join sections of conductor pipe in a piling operation, a transitioning tool (a drive adapter) in between the hammer sleeve and con-nector is always required for the operation, and therefore the anvil of the hammer never actually strikes onto the connec-tor directly. This transitioning assembly or tool is commonly known as a drive adapter, drive sub, drive chaser, chaser, pile follower or follower. A drive adapter is an apparatus, which typically will be specific to the connector in which it is to be used, and serves the purpose of protecting the connector during the piling operation by transferring energy from the hammer to the conductor pipe and connector, while itself maintaining an adequate sleeve gap. The drive adapter is a cylindrical tube, with the same outside diameter as the connector in which it is to be used, which contains an upper section of flush pipe which is placed inside of the sleeve of the hammer, and a lower section which is placed inside the connector and conductor pipe. This lower section is known as a stab-in spear, stabilizer, guide shoe or mule shoe, or in some cases can be a sleeve of its own commonly referred to as an "overshot", which is used to guide the drive adapter either into the inside diameter (in a stab-in spear type) or around the outside (in an overshot type) of the connector and conductor pipe. Hence, the spear will have an outside diameter which is smaller than the inside diameter of the conductor pipe being employed, just as the overshot will have an inside diameter which is larger than the outside diameter of the conductor pipe being employed, all while maintaining the same said size or air gap described in re-gards to the sleeve and conductor pipe. The drive adapter is attached to the sleeve by its own specifically placed pad eyes, which are placed low enough on the tube wall below the total swallow length of the sleeve, with standard slings or chains and shackles to the sleeve pad eyes, and at which point becomes a part of the overall hammer assembly.

However, the drive adapter, as a transitioning apparatus or tool in between the hammer and the conductor pipe, is a key weak point in the overall piling operation, and therefore prone to failure and is highly dangerous. In addition, the practice of placing drive adapters into service is not widely controlled or well understood, due to their re-usable nature and therefore the operational life of a tool is unregulated and only typically determined by non-destructive testing (NDT) means. These means can range from a standard vis-ual inspection to other more detailed practices like magnetic particle inspection (MPI) test, which mainly look for cracks or otherwise tell-tale signs of fa-tigue, and seldom a com-bination of said NDT and more importantly total number of hammer blows sustained throughout the life of the drive adapter, of which would be more appropriate. Even then, the means by which the drive adapter is attached to the sleeve itself as previously described, with welded pad eyes on both the sleeve and drive adapter itself connected by a sling or chain and shackle combo, as well, leaves these additional critical components as possible points of failure in their own right which as well require similar inspection tests to main-tain operational adequacy.

If a drive adapter or a securing component fails during an operation, apart from the obvious financial implications due to operational downtime or equipment damage, the accident risk can be highly dangerous and potentially fatal to per-sonnel involved in the operation. This is due to the nature of piling operations, which is always an overhead operation, involving human operators to operate the hammer itself, typically via some type of control cable or rope which is physically attached to the overhead hammer. This operation requires the operators to stand within close proximity of the tool and operation itself, of which is especially common on the typically cramped rig floors of drilling rigs and plat-forms. Even in the absence of a control cable, the operator must remain in close proximity of the operation for obser-vation purposes, and therefore will always remain in the "red zone" or "line of fire." When a component like the drive adapter fails or becomes unsecure, there exists a possibility of having dropped objects. It is apparent that piling opera-tions involving a drive adapter are an inherently risky, dangerous and potentially fatal operation.

Hence, what is needed is an apparatus, system and/or method for piling directly on conductor pipe with connectors which eliminates the need of a drive adapter, and that is safe, cost-effective, and simple to operate and imple-ment.

BRIEF SUMMARY

The disclosure described herein addresses the deficiencies and short-falls of the aforementioned systems and methods. Particularly, in one aspect of the disclosure described herein, a direct drive connector sleeve ("DDCS") apparatus can be installed and secured to the bottom of any type of impact piling hammer. Here the DDCS apparatus can maintain a larger inside diameter than the outside diameter of the conductor pipe and connector being employed. The impact piling hammer can then be lowered atop and then over the connector and conductor pipe and is subsequently received therein by the DDCS apparatus wherein the connector contacts the anvil inside the anvil housing atop the DDCS apparatus. In addition, the DDCS apparatus can centralize and secure the hammer atop the conductor pipe and con-nector while maintaining an adequate sleeve gap using flexible inserts or gussets which are secured to the inner circumferential wall of the DDCS apparatus. The flexible inserts or gussets allow the connector lip, upset, PDL load shoulder, or any other non-flush section or raised protrusion/bulge of the connector, to pass through the inside diameter of the DDCS apparatus by flexing temporarily and then returning to its original position once the non-flush section has passed the flexible inserts or gussets points of contact to adequately maintain the proper sleeve gap against the flush conductor pipe wall below the connector.

In another aspect of the disclosure described herein, spring-loaded inserts can be secured to the inner circumfer-ential wall of the DDCS apparatus. Here, the spring-loaded inserts can allow the connector lip, upset, PDL load shoul-der, or any other non-flush section or raised protrusion/bulge of the connector to pass through the inside diameter of the DDCS apparatus by constricting (or being compressed) temporarily and then returning to their original (non-com-pressed) position once the non-flush section has passed the spring-loaded points of contact to adequately maintain the proper sleeve gap against the flush conductor pipe wall below the connector.

In another of the disclosure described herein, manual or remotely controlled inserts are secured to the inner circum-ferential wall of the DDCS apparatus. The manual or remotely controlled inserts can be set to the open position in order to allow the connector lip, upset, PDL load shoulder, or any other non-flush section or raised protrusion/bulge of the connector to pass through the inside diameter of the DDS apparatus and then can be set to the close position once the non-flush section has passed the insert points of contact to adequately maintain the proper sleeve gap against the flush conductor pipe wall below the connector.

In another aspect of the disclosure described herein, bow springs can be secured to the inner circumferential wall of the DDCS apparatus. The bow springs allow the connector lip, upset, PDL load shoulder, or any other non-flush section or raised protrusion/bulge of the connector to pass through the inside diameter of the DDCS apparatus by flexing (or bending) temporarily inward and then returning to their original (non-flexed or non-bended) position once the non-flush section has passed the bow spring points of contact to adequately maintain the proper sleeve gap against the flush conductor pipe wall below the connector.

In another of the disclosure described herein, scissor inserts are secured to the inner circumferential wall of the DDCS apparatus. The scissor inserts allow the connector lip, upset, PDL load shoulder, or any other non-flush section or raised protrusion/bulge of the connector to pass through the inside diameter of the DDCS apparatus by flexing temporarily inward and then returning to its original position once the non-flush section has passed the scissor insert points of contact to adequately maintain the proper sleeve gap against the flush conductor pipe wall below the connector.

In another aspect of the disclosure described herein, a hinged-split and latching DDCS apparatus with fixed inserts secured to the inner circumferential wall of the DDCS apparatus can be manually or remotely opened and closed. The manually or remotely controlled latch can be set to the open position in order to allow the connector lip, upset, PDL load shoulder, or any other non-flush section or raised protrusion/bulge of the connector to pass through the inside diameter of the DDCS apparatus and then set to the close position once non-flush section has passed the fixed inserts points of contact to adequately maintain the proper sleeve gap against the flush conductor pipe wall below the connector.

Here, the process of eliminating the need for a drive adapter while maintaining the proper sleeve gap requirements against the flush conductor pipe wall below the non-flush connector is achieved by allowing any non-flush section of the connector to easily pass through the DDCS apparatus and contact the anvil. The foregoing can be accomplished while still maintaining centrality and security with the pile itself below the connector against the conductor pipe wall so that maximum stability and therefore maximum energy can be transferred from the impact piling hammer to anvil to the connector and conductor pipe or pile.

In another aspect of the disclosure described herein, a DDCS apparatus is provided for attachment below any type of hammer. Here, the placement of the DDCS apparatus can be below an anvil housing section which typically contains the anvil. In addition, the placement of the DDCS apparatus can be directly below the hammer, and here in the absence of a dedicated anvil housing the anvil will be housed atop the DDCS apparatus. The DDCS apparatus can be secured to the hammer or anvil housing using fasteners. Further, the DDCS apparatus can be secured to the hammer or anvil housing by means of welding.

In another aspect of the disclosure described herein, a method of de-ploying a DDCS assembly can be installed below a hammer, thereby allowing a connector lip, upset, PDL load shoulder, or any other non-flush section or raised protrusion/bulge of the connector to pass through the inner section of the DDCS assembly. The method can include inserts flexing, constricting, contracting or moving inwards to allow the non-flush section of the connector to easily pass through the DDCS assembly and contact the anvil while still maintaining centrality and security with the pile itself below the connector against the conductor pipe wall so that maximum stability, and in effect transfer maximum energy from the impact piling hammer to anvil to the connector and conductor pipe or pile.

In another aspect of the disclosure described herein, a method of de-ploying a DDCS assembly is disclosed that can be installed below a hammer, thereby allowing a connector lip, upset, PDL load shoulder, or any other non-flush section or raised protrusion/bulge of the connector to pass through the inner section of the DDCS assembly. The method can include a hinged-split and latching DDCS assembly with fixed inserts secured to the inner circumferential wall which the manually or remotely controlled latch will be set to the open position in order to allow the connector lip, upset, PDL load shoulder, or any other non-flush section or raised protrusion/bulge of the connector to pass through the inside diameter of the DDCS assembly and then set to the close position once the non-flush section has passed the fixed inserts points of contact to adequately maintain the proper sleeve gap against the flush conductor pipe wall below the connector. In effect, the foregoing can transfer maximum energy from the impact piling hammer to anvil to the connector and conductor pipe or pile.

In another aspect of the disclosure described herein, an impact hammer sleeve for oil and gas conductor operations is disclosing having a tubular sleeve member having interior and exterior wall regions, and a plurality of biasing members disposed within the interior wall region of the tubular sleeve. In addition, the tubular sleeve can be configured to receive a conductor pipe and connector therein. Further, the plurality of biasing members can include one or more compression type biasing members. Further, the plurality of biasing members can be configured to engage the conductor pipe, and the plurality of biasing members can be secured to the interior wall region of the tubular sleeve or the plurality of biasing members can be secured to the exterior wall region of the tubular sleeve. Here, the biasing members can include at least one of: a biased ball bearing, biased plunger, biased leaf spring, or biased scissor spring. In addition, the tubular sleeve can further include a plurality of cavities for receiving the plurality biasing members therein. In addition, the plurality of cavities each can include a compression spring therein coupled to an engagement member. Here, the plurality of biasing members can also in-dude a deflecting or flexible tab member having two ends secured to the interior or exterior walls of the tubular sleeve. In addition, the plurality of biasing members are configured to allow a connector, thread protector lip, or an upset to pass therethrough.

In another aspect of the disclosure described herein, a method of installing an impact hammer sleeve for oil and gas conductor operations is disclosed. The method can include lowering a tubular sleeve member, wherein the tubular sleeve member includes interior and exterior wall regions, and wherein the tubular sleeve further comprises a plurality of biasing members disposed within the interior wall region of the tubular sleeve. The method can further include disposing or sliding the tubular sleeve over a conductor pipe and connector, wherein the conductor pipe and connector engages the plurality of biasing members of the tubular sleeve and received within the tubular sleeve.

In another aspect of the disclosure described herein, an impact hammer sleeve for oil and gas conductor operations is disclosed. The sleeve can include a tubular sleeve member having interior and exterior wall regions. In addition, the tubular sleeve can include a first half and a second half, wherein the first half and second half pivot about an axis via a hinge member to open and close. In addition, a plurality of protruding members can be disposed within the interior wall region of the tubular sleeve, and one or more securement members can be disposed on the exterior wall region of the tubular sleeve. Here, the plurality of protruding members can extend vertically or horizontally within the interior wall region of the tubular sleeve. Further, the plurality of protruding members can be flexible, elastic, or rigid. In addition, the securement members can include one or more latches or locks.

In another aspect of the disclosure described herein, a method of installing an impact hammer sleeve for oil and gas conductor operations is disclosed. The method can include lowering a tubular sleeve member, wherein the tubular sleeve member comprises interior and exterior wall regions and having a plurality of protruding members disposed within the interior wall region of the tubular sleeve, wherein the tubular sleeve comprises a first half and a second half, and wherein the first half and second half pivot about an axis via a hinge member. In addition, the method can include opening the first half and second half of the tubular sleeve via the hinge member. The method can also include sliding the tubular sleeve over a conductor pipe and connector, wherein the connector, a thread protector lip, or an upset pass therethrough and engage the plurality of protruding members of the tubular sleeve. The method can also include closing the first half and second half of the tubular sleeve via the hinge member, and securing the first half and second half of the tubular sleeve via one or more securement members disposed on the exterior wall region of the tubular sleeve.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fash-ion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (in-cluding method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advanta-geous features and all the advantages need to be incorporated into every embodiment of the disclosure described herein.

Figure 1A:
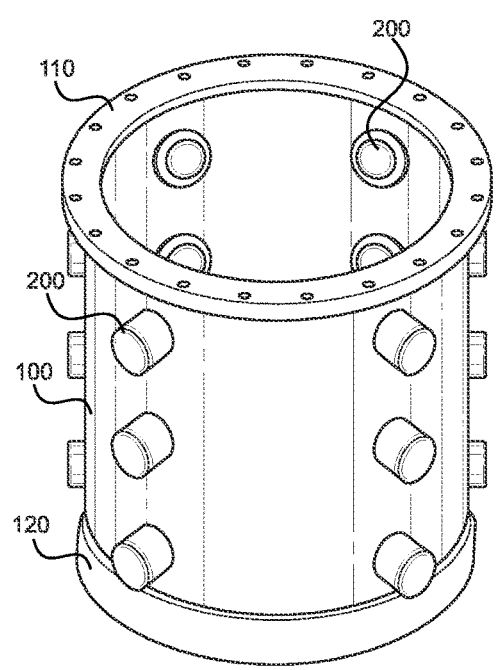
FIG. 1A illustrates a perspective view for one non-limiting exemplary embodiment of a DDCS apparatus of the disclosure described herein having integrated ball spring inserts.
Figure 1B:
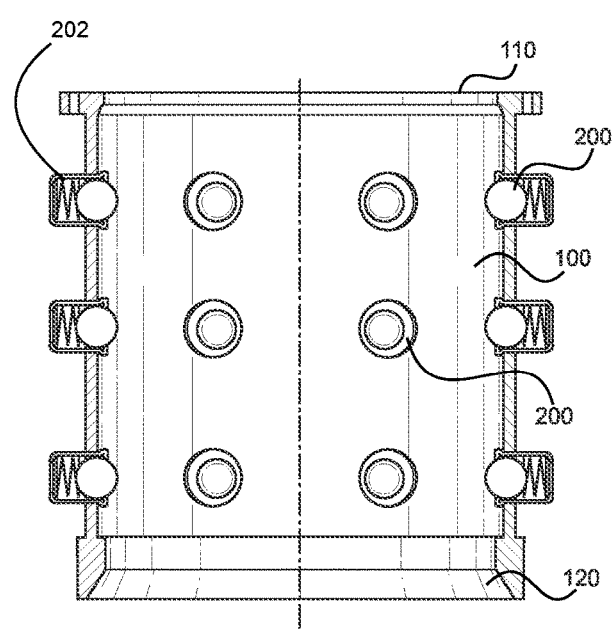
FIG. 1B illustrates a partial cross-sectional side view for the DDCS apparatus of FIG. 1A.

FIGS. 1A-1B illustrate various views for one non-limiting exemplary embodiment of the DDCS apparatus of the present disclosure described herein. Here, DDCS apparatus 100 can include a tubular housing or casing having a plurality of inserts 200, which can also be referred to herein as ball spring plungers, biased ball bearings, ribs, gussets, biasing members, or the like. Here, inserts 200 can operate as biasing members disposed within the interior wall space of the DDCS apparatus 100. Specifically, each insert 200 is comprised of a ball or spherical object that can spin and rotate in static position while biased via a spring, such as a compressing spring. In addition, a housing or shell 202 disposed on the side walls of DDCS 100 may further house and receive their inserts 200 within a cavity of casing 202, wherein both the ball and biasing member can be secured therein. In addition, each casing 202 can include a lip or flange element that allows the ball of insert 200 to abut against it and prevent the ball of insert 200 from being removed or falling out of casing 212.

Still referring to FIGS. 1A-1B, inserts 200 can deflect or move in a lin-ear configuration or direction thereby recessing or contracting inwards and ex-panding outwards within the cavity of casing 202. Alternatively, inserts 200 can recess or contract inwards within the walls of DDCS 100 or within shell 202 in any direction in any plane. Further, DDCS apparatus 100 may also include a fastening connection ring 110 that allow the DDCS apparatus 100 to be fastened, secured and connected to an anvil housing and/or hammer. In addition, the tapered opening guide ring 120 will provide an opening for guiding and centralizing the conductor pipe and connector to enter the interior walled space of the DDCS apparatus 100. Here, DDCS 100 is shown with 36 inserts 200 disposed around the perimeter of its housing. However, it is contemplated within the scope of the present disclosure described herein that DDCS 100 may include any number of inserts. In addition, the size and configuration of the inserts for DDCS will depend on the various tubular pipe diameter applications. For example, if a 40" inside diameter sleeve DDCS 100 is used which is to receive a 36" outside diameter pipe with a PDL lip that is 38" in outside diameter, then the applicable insert would be about 2" each in length (about 2" on one side of the wall and about 2" on an opposing side of the wall equating to about 4-in. total) in a static position to hold the 36" pipe center in place. In addition, the ball bearing of insert 200 may need to flex or deflect inwards into the housing or cavity of housing 202 about 1" each (about 1" on one side and about 1" on the opposing side equating to about 2" total) to allow the lip to pass through temporarily. However, if in another example, a 30" pipe with a 32" lip is to be inserted within DDCS 100, then inserts 200 may need to be replaced with larger and longer ones to accommodate for the different tubular pipe application.

Figure 2A:
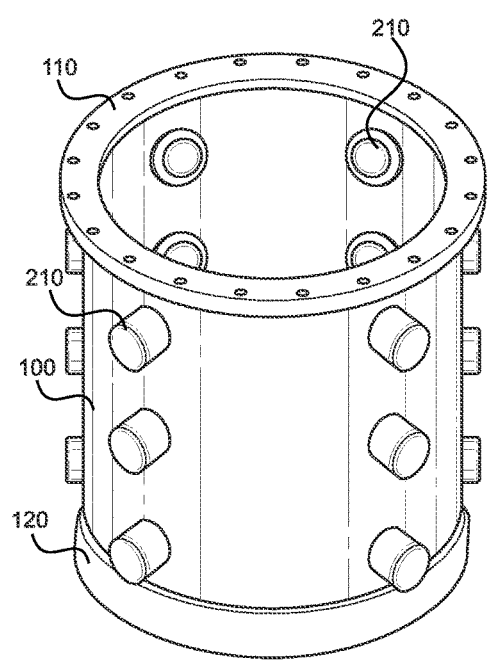
FIG. 2A illustrates a perspective view for one non-limiting exemplary embodiment of a DDCS apparatus of the disclosure described herein having integrated plunger-style spring inserts.
Figure 2B:
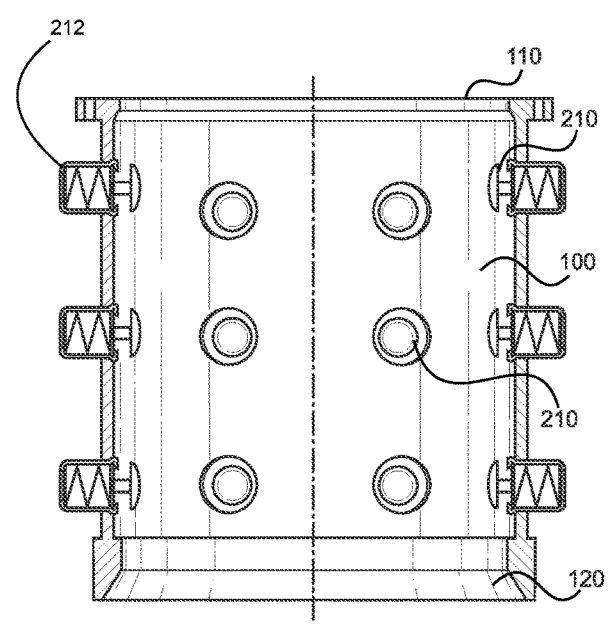
FIG. 2B illustrates a partial cross-sectional side view for the DDCS apparatus of FIG. 2A.

FIGS. 2A-2B illustrate various views for another non-limiting exemplary embodiment of the DDCS apparatus of the present disclosure described herein. Here, DDCS apparatus 100 can include a tubular housing or casing having a plurality of inserts 210, which can also be referred to herein as bolt spring plungers, biased bolt or nail head style plungers, ribs, gussets, biasing members, or the like. Here, inserts 210 can operate as biasing members disposed within the interior wall space of the DDCS apparatus 100. Specifically, each insert 210 is comprised of a head and stem that is secured to one end of a biasing member, such as a compression spring. In addition, a housing or shell 212 disposed on the side walls of DDCS 100 may further house and receive inserts 210 within a cavity of casing 212, wherein both the ball and biasing member can be secured therein. In addition, each casing 212 can include a lip or flange element that allows the biasing member and proximal end of the plunger to abut against it and prevent the spring and plunger insert 210 from being removed or falling out of casing 212.

Still referring to FIGS. 2A-2B, inserts 210 can deflect or move in a lin-ear configuration or direction thereby recessing or contracting inwards and ex-panding outwards from the walls of DDCS 100. Alternatively, inserts 210 can recess or contract inwards within the walls of DDCS 100 or within shell 212 in any direction in any plane. Further, DDCS apparatus 100 may also include a fastening connection ring 110 that allow the DDCS apparatus 100 to be fastened, secured and connected to an anvil housing and/or hammer. In addition, the tapered opening guide ring 120 will provide an opening for guiding and centralizing the conductor pipe and connector to enter the interior walled space of the DDCS apparatus 100. Here, DDCS 100 is shown with 36 inserts 210 disposed around the perimeter of its housing. However, it is contemplated within the scope of the present disclosure described herein that DDCS 100 may include any number of inserts. In addition, the size and configuration of the inserts for DDCS will depend on the various tubular pipe diameter applications. For example, if a 40" inside diameter sleeve DDCS 100 is used which is to receive a 36" outside diameter pipe with a PDL lip that is 38" in outside diameter, then the applicable insert would be about 2" each in length (about 2" on one side of the wall and about 2" on an opposing side of the wall equating to about 4-in. total) in a static position to hold the 36" pipe center in place. In addition, the plunger of insert 220 may need to flex or deflect inwards into the housing or cavity of housing 212 about 1" each (about 1" on one side and about 1" on the opposing side equating to about 2" total) to allow the lip to pass through temporarily. However, if in another example, a 30" pipe with a 32" lip is to be inserted within DDCS 100, then inserts 210 may need to be replaced with larger and longer ones to accommodate for the different tubular pipe application.

Figure 3A:
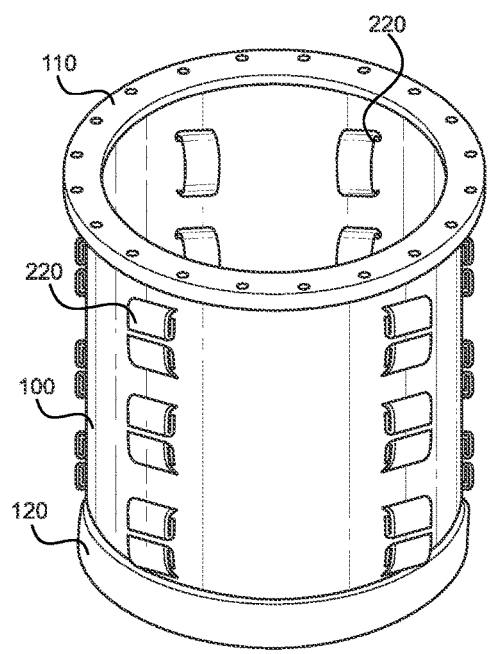
FIG. 3A illustrates a perspective view for one non-limiting exemplary embodiment of a DDCS apparatus of the disclosure described herein having integrated bow spring inserts.
Figure 3B:
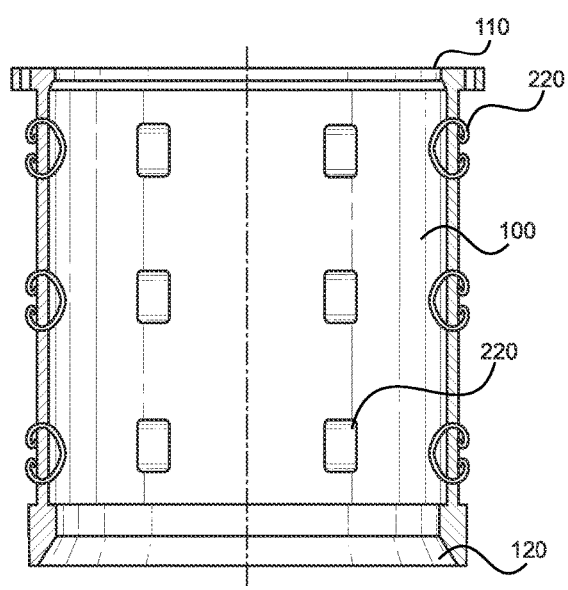
FIG. 3B illustrates a partial cross-sectional side view for the DDCS apparatus of FIG. 3A.

FIGS. 3A-3B illustrate various views for another non-limiting exemplary embodiment of the DDCS apparatus of the present disclosure described herein. Here, DDCS apparatus 100 can include a tubular housing or casing having a plurality of inserts 220, which can also be referred to herein as biased ribs, gussets, tabs, leaf type springs, biasing members, or the like. Here, inserts 220 can operate as biasing members disposed within the interior wall space of the DDCS apparatus 100. Specifically, each insert 220 is comprised of a par-tially rounded or curved member, such as a piece of metal material, that has its ends secured to the walls DDCS 100, and which operates similar to an in-verted leaf spring or a flexible tab. Specially, insert 220 can have its outer region depressed or deflected inwards in a biasing manner, such as force or pressure being applied near or at the crest region of curved insert 220. In addition, each insert 220 may have its ends slid slots disposed on the walls of DDCS 100, where each end of insert 220 is crimped, secured, affixed, or welded to the exterior walls of DDCS 100. Alternatively, the ends of insert 220 may also be secured or affixed to the interior walls of DDCS 100. In addition, it is contemplated within the scope of the present disclosure described herein that each insert 220 may have multiple layers stacked on top of each other to modify the compression ratio of insert 220.

Still referring to FIGS. 3A-3B, inserts 220 can deflect or move in a lin-ear configuration or direction thereby recessing or contracting inwards and ex-panding outwards relative to the walls of DDCS 100. Alternatively, inserts 220 can recess or contract inwards within a cavity within the walls of DDCS 100 in any direction in any plane. Further, DDCS apparatus 100 may also include a fastening connection ring 110 that allow the DDCS apparatus 100 to be fastened, secured and connected to an anvil housing and/or hammer. In addition, the tapered opening guide ring 120 will provide an opening for guiding and centralizing the conductor pipe and connector to enter the interior walled space of the DDCS apparatus 100. Here, DDCS 100 is shown with 36 inserts 220 disposed around the perimeter of its housing. However, it is contemplated within the scope of the present disclosure described herein that DDCS 100 may include any number of inserts. In addition, the size and configuration of the inserts for DDCS will depend on the various tubular pipe diameter applications. For example, if a 40" inside diameter sleeve DDCS 100 is used which is to receive a 36" outside diameter pipe with a PDL lip that is 38" in outside diameter, then the applicable insert would be about 2" each in length (about 2" on one side of the wall and about 2" on an opposing side of the wall equating to about 4-in. total) in a static position to hold the 36" pipe center in place. In addition, the insert 220 may need to flex or deflect inwards about 1" each (about 1" on one side and about 1" on the opposing side equating to about 2" total) to allow the lip to pass through temporarily. However, if in another example, a 30" pipe with a 32" lip is to be inserted within DDCS 100, then inserts 220 may need to be replaced with larger and longer ones to accommodate for the different tubular pipe application.

Figure 4A:
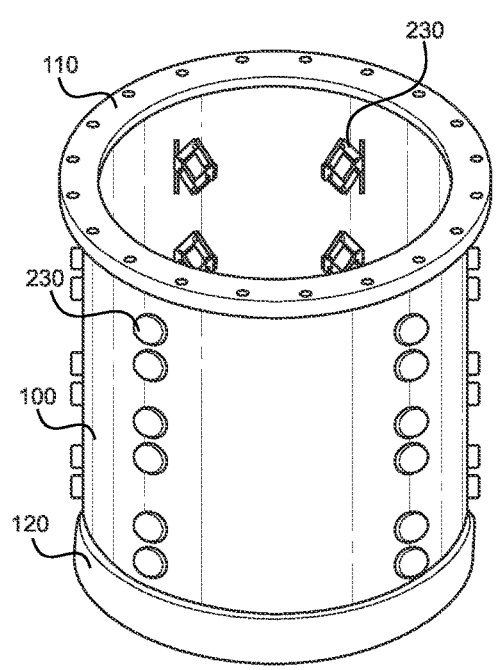
FIG. 4A illustrates a perspective view for one non-limiting exemplary embodiment of a DDCS apparatus of the present invention having integrated biased scissor inserts.
Figure 4B:
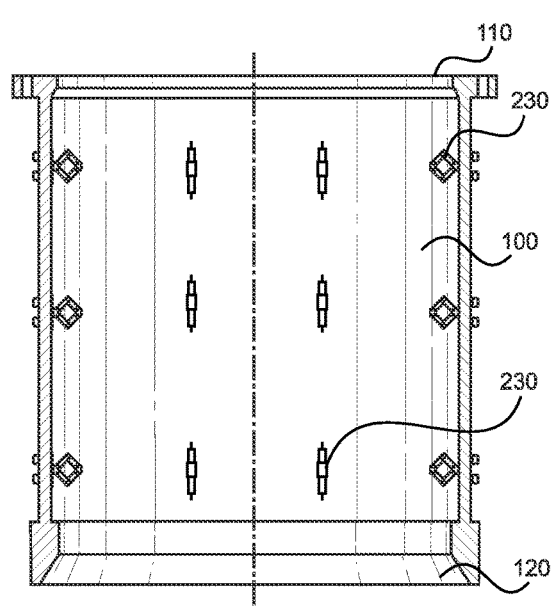
FIG. 4B illustrates a partial cross-sectional side view for the DDCS apparatus of FIG. 4A.

FIGS. 4A-4B illustrate various views for another non-limiting exemplary embodiment of the DDCS apparatus of the present disclosure described herein. Here, DDCS apparatus 100 can include a tubular housing or casing having a plurality of inserts 230, which can also be referred to herein as biased scissor member, biased retractable members, ribs, gussets, biasing members, or the like. Here, inserts 230 can operate as biasing members disposed within the interior wall space of the DDCS apparatus 100. Specifically, each insert 230 is comprised of a linked members that are biased or compress in a paral-lelogram configuration that is secured to the walls DDCS 100, and which operates similar biased lifting or scissor type jack member. Specially, insert 230 can have its outer region depressed or deflected inwards in a biasing manner, such as force or pressure being applied near or at the distal region insert 230. In addition, each insert 230 may have its ends slid within one or more slots or openings disposed on the walls of DDCS 100, where the end of insert 230 is crimped, secured, affixed, or welded to the exterior walls of DDCS 100. Alternatively, the ends of each insert 230 may also be secured or affixed to the interior walls of DDCS 100.

Still referring to FIGS. 4A-4B, inserts 230 can deflect or move in a lin-ear configuration or direction thereby recess-ing or contracting inwards and ex-panding outwards relative to the walls of DDCS 100. Alternatively, inserts 230 can recess or contract inwards within a cavity within the walls of DDCS 100 in any direction in any plane. Further, DDCS apparatus 100 may also include a fastening connection ring 110 that allow the DDCS apparatus 100 to be fastened, secured and connected to an anvil housing and/or hammer. In addition, the tapered opening guide ring 120 will provide an opening for guiding and centralizing the conductor pipe and connector to enter the interior walled space of the DDCS apparatus 100. Here, DDCS 100 is shown with 36 inserts 230 disposed around the perimeter of its housing. However, it is contemplated within the scope of the present disclosure described herein that DDCS 100 may include any number of inserts. In addition, the size and configuration of the inserts for DDCS will depend on the various tubular pipe diameter applications. For example, if a 40" inside diameter sleeve DDCS 100 is used which is to receive a 36" outside diameter pipe with a PDL lip that is 38" in outside diameter, then the applicable insert would be about 2" each in length (about 2" on one side of the wall and about 2" on an opposing side of the wall equating to about 4-in. total) in a static position to hold the 36" pipe center in place. In addition, the insert 230 may need to flex or deflect inwards about 1" each (about 1" on one side and about 1" on the opposing side equating to about 2" total) to allow the lip to pass through temporarily. However, if in another example, a 30" pipe with a 32" lip is to be inserted within DDCS 100, then inserts 230 may need to be replaced with larger and longer ones to accommodate for the different tubular pipe application.

Figure 5A:
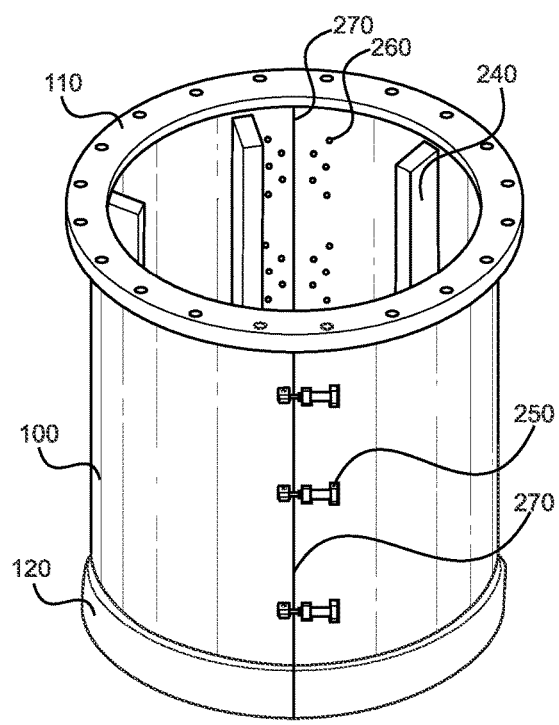
FIG. 5A illustrates a perspective front view for one non-limiting exemplary embodiment of a DDCS apparatus of the disclosure described herein having a split-hinged and latching body with fixed inserts.
Figure 5B:
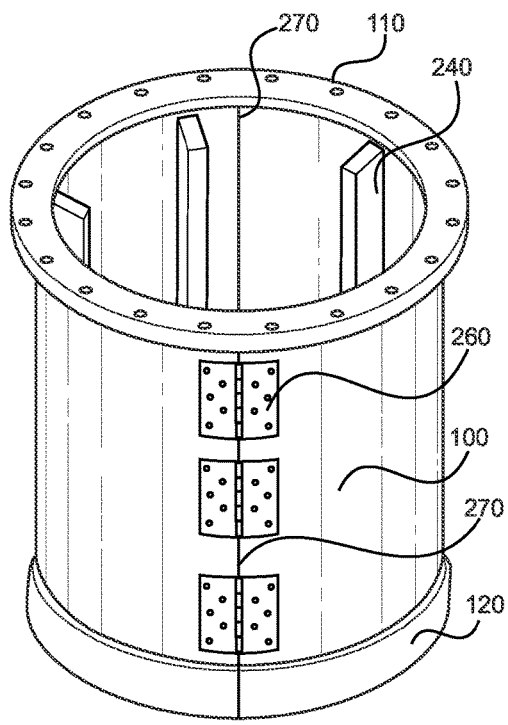
FIG. 5B illustrates a perspective rear view for the DDCS apparatus of FIG. 5A.

FIGS. 5A-5B illustrate various views for one non-limiting exemplary embodiment of the DDCS apparatus of the present disclosure described herein. Here, DDCS apparatus 100 can include a plurality of inserts 240, which can also be referred to herein as either rigid, semi-rigid, flexible, pad-ded, elastic, or biased ribs, or gussets, among others. Here, inserts 240 can be disposed within the interior wall space of the DDCS apparatus 100 in equal distances relative to each other. Further, inserts 240 can be secured or position verti-cally relative to the interior wall of DDCS 100 and hori-zontally project or protrude outwards. In addition, the body of the DDCS apparatus 100 can be split at region 270 vertically into two halves, with a plurality of hinges 260 on an opposing side securing both split sides together which allow it to open about an axis on one end. In addition, a plurality of securement members or latches 250 that allow the DDCS apparatus 100 to open and close about the hinge 160. Here, latches 250 can also be brackets or release and locking/tension members. Here, when in the open position, the conductor pipe, connector and any non-flush protrusion will be able to pass through the interior walled section of the DDCS apparatus 100 vertically without interference from the fixed inserts 240. Once the protrusion has cleared the fixed inserts 240, the plurality of latches 250 can be set to the closed position, therein closing the body of the DDCS apparatus 100. Alternatively, latches 250 can also operate as biasing members that can include piston having a com-pressed fluid and/or a compression spring therein which allow latches 250 to extend outwards when a force is applied to one or both ends of latches 250. Further, DDCS apparatus 100 may also include a fastening connection ring 110 that allow the DDCS apparatus 100 to be fastened, secured and connected to an anvil housing and/or hammer. In addition, the tapered opening guide ring 120 will provide an opening for guiding and centralizing the conductor pipe and connec-tor to enter the interior walled space of the DDCS apparatus 100.

Figure 6A:
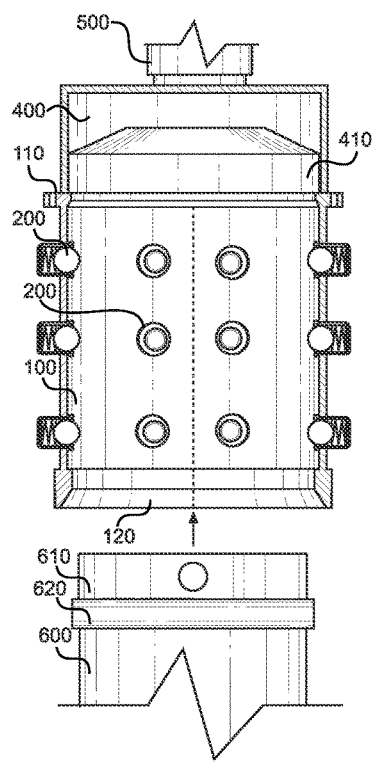
FIGS. 6A-6C illustrate partial cross-sectional views for the DDCS apparatus of FIG. 1A in one non-limiting exemplary embodiment of a method of operation, wherein the DDCS apparatus is shown secured to a hammer and anvil housing, wherein a conductor pipe, connector and PDL are shown below, passing vertically through flexing the inserts and finally contacting the anvil and securing to the hammer assembly.
Figure 6B:
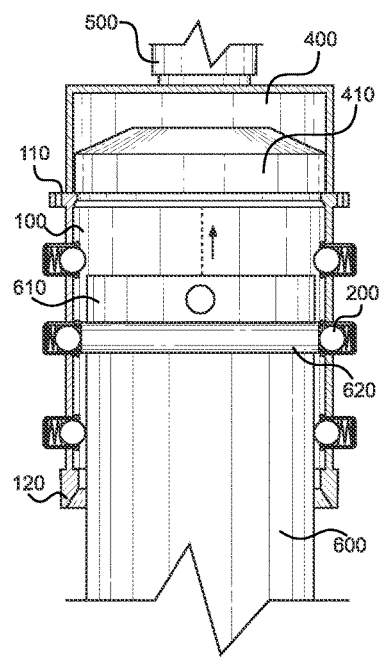
Figure 6C:
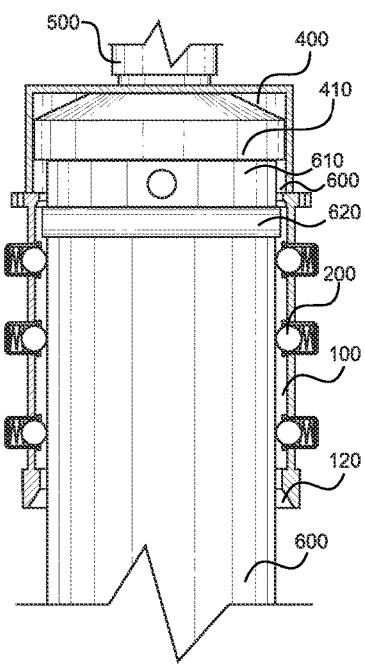

FIGS. 6A-6C, illustrate one non-limiting exemplary embodiment of an operation for the DDCS apparatus 100 of FIGS. 1A-1B. Here, hammer 500 is shown as an assembly connected at its base to the anvil housing 400, wherein housing 300 houses anvil 410, which is then connected at its base to the DDCS apparatus 100 via the fastening connec-tion ring 110. In addition, a conductor pipe and connector 600, with a PDL 610 with integrated shoulder 620 are shown in practical relative sequence of operation. Specifically, the first step shown in FIG. 6A illustrates the pipe 600 before being inserted, the second step in FIG. 6B illustrating the pipe 600 passing vertically through the DDCS apparatus 100 and engaging inserts 200 (wherein the inserts 200 further stabilized and center pipe 600), and the final step in FIG. 6C illustrating the engaging of the anvil 410 and secured to the entire hammer 500 assembly, with the walls of conductor pipe 600 shown at a safe offset relative to the interior walls of DDCS 100.

In particular, referring to FIG. 6A, inside of the DDCS apparatus 100 the plurality of inserts 200 are shown in their outward (static) position, as well as the anvil 410 is shown in its low (disengaged) position inside the anvil housing 400 due to the DDCS apparatus 100 being empty as the conductor pipe and connector 600, with PDL 610 with integrated shoulder 620 have yet to be inserted and remain outside and below the DDCS apparatus 100.

Referring to FIG. 6B, the conductor pipe and connector 600, with PDL 610 with integrated load shoulder 620 are shown half-way inserted into the DDCS apparatus 100. Here, a few of the total plurality of inserts 200 which are engaged by the outward protruding PDL 610 load shoulder 620 are shown in their inward (dynamic) position, flexing and being depressed to allow the PDL 610 load shoulder 620 to pass through the inside the DDCS apparatus 100. The remaining plurality of inserts 200 remain in their outward (static) position maintaining the proper sleeve gap requirements with the flush wall of the conductor pipe and connector 600. The anvil 410 is still shown in its low (disengaged) position inside the anvil housing 400 as the conductor pipe and connector 600 are not yet fully inserted into the DDCS apparatus 100.

Referring to FIG. 6C, the conductor pipe and connector 600, with PDL 610 with integrated load shoulder 620 are shown fully inserted into the DDCS apparatus 100. The PDL 610 integrated load shoulder 620 have traveled past the total plurality of inserts 200. Here, the inserts 200 are shown back in their outward (static) position maintaining the proper sleeve gap requirements with the flush wall of the conductor pipe and connector 600. In addition, the anvil 410 is now shown in its high (engaged) position inside the anvil housing 400 as the conductor pipe and connector 600 are fully inserted into the DDCS apparatus 100. Here, the entire hammer 500 assembly is shown fully and securely engaged with the conductor pipe and connector 600 assembly and operations can commence.

Figure 7A:
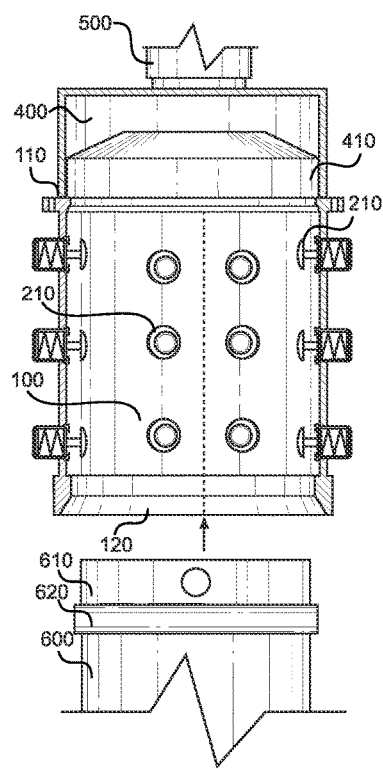
FIGS. 7A-7C illustrate partial cross-sectional views for the DDCS apparatus of FIG. 2A in one non-limiting exemplary embodiment of a method of operation, wherein the DDCS apparatus is shown attached to a hammer and anvil housing, wherein a conductor pipe, connector and PDL are shown below, passing vertically through flexing the inserts and finally contacting the anvil and securing to the hammer assembly.
Figure 7B:
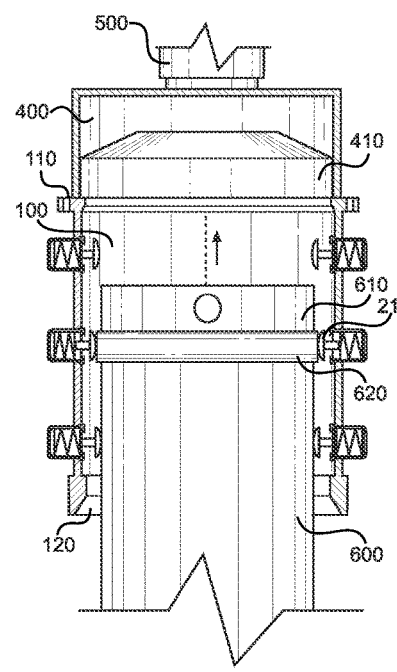
Figure 7C:
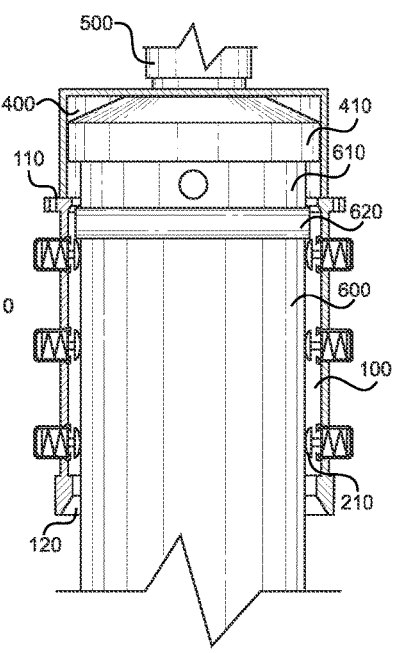

FIGS. 7A-7C, illustrate one non-limiting exemplary embodiment of a operation for the DDCS apparatus 100 of FIGS. 2A-2B. Here, hammer 500 is shown as an assembly connected at its base to the anvil housing 400, wherein housing 300 houses anvil 410, which is then connected at its base to the DDCS apparatus 100 via the fastening connection ring 110. In addition, a conductor pipe and connector 600, with a PDL 610 with integrated shoulder 620 are shown in practical relative sequence of operation. Specifically, the first step shown in FIG. 6A illustrates the pipe 600 before being inserted, the second step in FIG. 6B illustrating the pipe 600 passing vertically through the DDCS apparatus 100 and engaging inserts 210 (wherein the inserts 210 further stabilized and center pipe 600), and the final step in FIG. 6C illustrating the engaging of the anvil 410 and secured to the entire hammer 500 assembly, with the walls of conductor pipe 600 shown at a safe offset relative to the interior walls of DDCS 100.

In particular, referring to FIG. 7A, inside of the DDCS apparatus 100 the plurality of inserts 210 are shown in their outward (static) position, as well as the anvil 410 is shown in its low (disengaged) position inside the anvil housing 400 due to the DDCS apparatus 100 being empty as the conductor pipe and connector 600, with PDL 610 with integrated shoulder 620 have yet to be inserted and remain outside and below the DDCS apparatus 100.

Referring to FIG. 7B, the conductor pipe and connector 600, with PDL 610 with integrated load shoulder 620 are shown half-way inserted into the DDCS apparatus 100. Here, a few of the total plurality of inserts 210 which are engaged by the outward protruding PDL 610 load shoulder 620 are shown in their inward (dynamic) position, flexing and being depressed to allow the PDL 610 load shoulder 620 to pass through the inside the DDCS apparatus 100. The remaining plurality of inserts 210 remain in their outward (static) position maintaining the proper sleeve gap requirements with the flush wall of the conductor pipe and connector 600. The anvil 410 is still shown in its low (disengaged) position inside the anvil housing 400 as the conductor pipe and connector 600 are not yet fully inserted into the DDCS apparatus 100.

Referring to FIG. 7C, the conductor pipe and connector 600, with PDL 610 with integrated load shoulder 620 are shown fully inserted into the DDCS apparatus 100. The PDL 610 integrated load shoulder 620 have traveled past the total plurality of inserts 210. Here, the inserts 210 are shown back in their outward (static) position maintaining the proper sleeve gap requirements with the flush wall of the conductor pipe and connector 600. In addition, the anvil 410 is now shown in its high (engaged) position inside the anvil housing 400 as the conductor pipe and connector 600 are fully inserted into the DDCS apparatus 100. Here, the entire hammer 500 assembly is shown fully and securely engaged with the conductor pipe and connector 600 assembly and operations can commence.

Figure 8A:
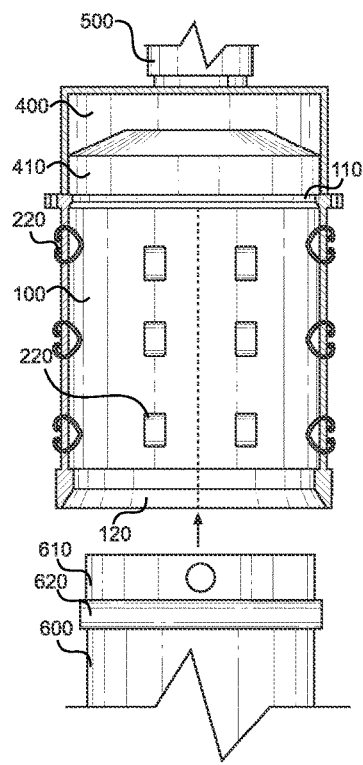
FIGS. 8A-8C illustrate partial cross-sectional views for the DDCS apparatus of FIG. 3A in one non-limiting exemplary embodiment of a method of operation, wherein the DDCS apparatus is shown attached to a hammer and anvil housing, wherein a conductor pipe, connector and PDL are shown below, passing vertically through flexing the inserts and finally contacting the anvil and securing to the hammer assembly.
Figure 8B:
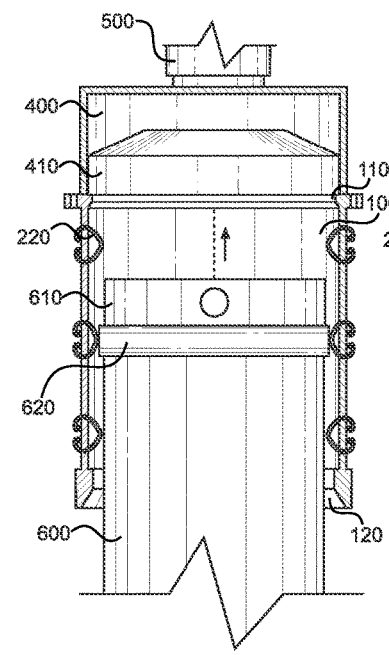
Figure 8C:
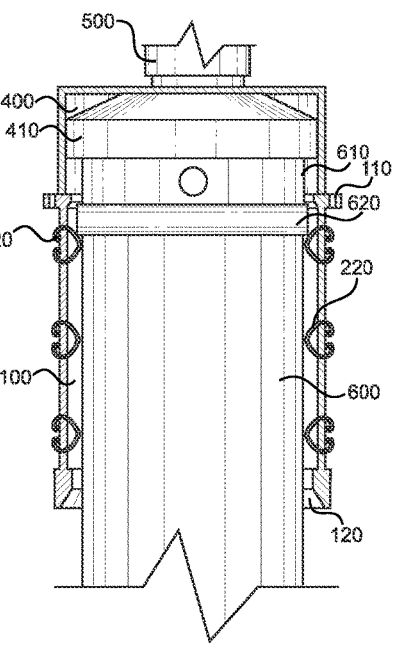

FIGS. 8A-8C illustrate one non-limiting exemplary embodiment of a operation for the DDCS apparatus 100 of FIGS. 3A-3B. Here, hammer 500 is shown as an assembly connected at its base to the anvil housing 400, wherein housing 300 houses anvil 410, which is then connected at its base to the DDCS apparatus 100 via the fastening connection ring 110. In addition, a conductor pipe and connector 600, with a PDL 610 with integrated shoulder 620 are shown in practical relative sequence of operation. Specifically, the first step shown in FIG. 6A illustrates the pipe 600 before being inserted, the second step in FIG. 6B illustrating the pipe 600 passing vertically through the DDCS apparatus 100 and engaging inserts 220 (wherein the inserts 220 further stabilize and center pipe 600), and the final step in FIG. 6C illustrating the engaging of the anvil 410 and secured to the entire hammer 500 assembly, with the walls of conductor pipe 600 shown at a safe offset relative to the interior walls of DDCS 100.

In particular, referring to FIG. 8A, inside of the DDCS apparatus 100 the plurality of inserts 220 are shown in their outward (static) position, as well as the anvil 410 is shown in its low (disengaged) position inside the anvil housing 400 due to the DDCS apparatus 100 being empty as the conductor pipe and connector 600, with PDL 610 with integrated shoulder 620 have yet to be inserted and remain outside and below the DDCS apparatus 100.

Referring to FIG. 8B, the conductor pipe and connector 600, with PDL 610 with integrated load shoulder 620 are shown half-way inserted into the DDCS apparatus 100. Here, a few of the total plurality of inserts 200 which are engaged by the outward protruding PDL 610 load shoulder 620 are shown in their inward (dynamic) position, flexing and being depressed to allow the PDL 610 load shoulder 620 to pass through the inside the DDCS apparatus 100. The remaining plurality of inserts 220 remain in their outward (static) position maintaining the proper sleeve gap requirements with the flush wall of the conductor pipe and connector 600. The anvil 410 is still shown in its low (disengaged) position inside the anvil housing 400 as the conductor pipe and connector 600 are not yet fully inserted into the DDCS apparatus 100.

Referring to FIG. 8C, the conductor pipe and connector 600, with PDL 610 with integrated load shoulder 620 are shown fully inserted into the DDCS apparatus 100. The PDL 610 integrated load shoulder 620 have traveled past the total plurality of inserts 220. Here, the inserts 220 are shown back in their outward (static) position maintaining the proper sleeve gap requirements with the flush wall of the conductor pipe and connector 600. In addition, the anvil 410 is now shown in its high (engaged) position inside the anvil housing 400 as the conductor pipe and connector 600 are fully inserted into the DDCS apparatus 100. Here, the entire hammer 500 assembly is shown fully and securely engaged with the conductor pipe and connector 600 assembly and operations can commence.

Figure 9A:
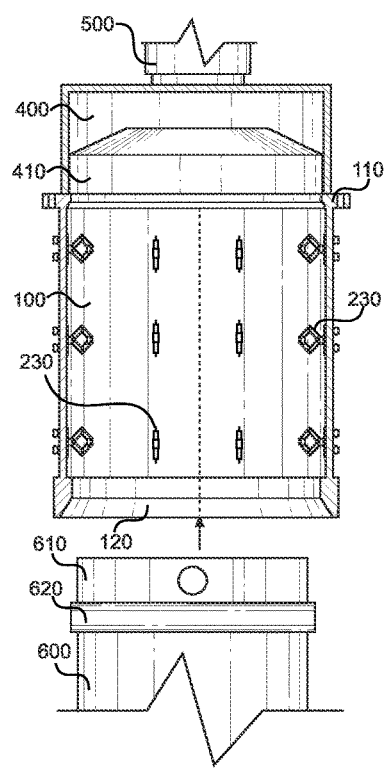
FIGS. 9A-9C illustrate partial cross-sectional views for the DDCS apparatus of FIG. 4A in one non-limiting exemplary embodiment of a method of operation, wherein the DDCS apparatus is shown attached to a hammer and anvil housing, wherein a conductor pipe, connector and PDL are shown below, passing vertically through flexing the inserts and finally contacting the anvil and securing to the hammer assembly.
Figure 9B:
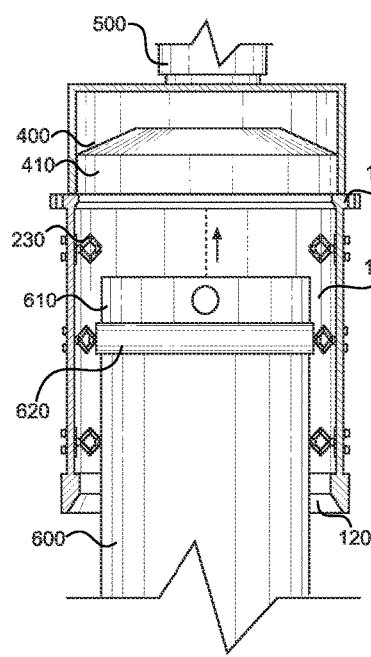
Figure 9C:
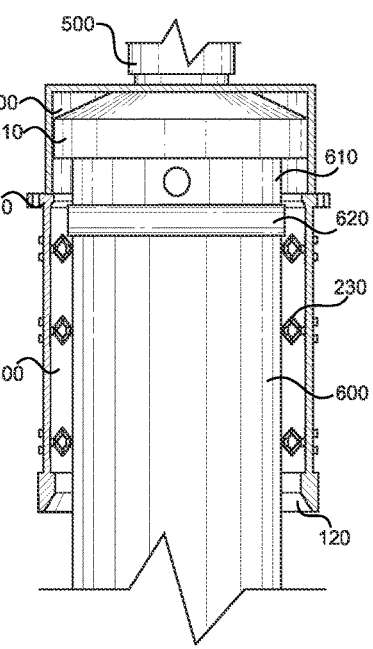

FIGS. 9A-9C, illustrate one non-limiting exemplary embodiment of a method of operation for the DDCS apparatus 100 of FIGS. 4A-4B. Here, hammer 500 is shown as an assembly connected at its base to the anvil housing 400, wherein housing 300 houses anvil 410, which is then connected at its base to the DDCS apparatus 100 via the fastening connection ring 110. In addition, a conductor pipe and connector 600, with a PDL 610 with integrated shoulder 620 are shown in practical relative sequence of operation. Specifically, the first step shown in FIG. 6A illustrates the pipe 600 before being inserted, the second step in FIG. 6B illustrating the pipe 600 passing vertically through the DDCS apparatus 100 and engaging inserts 230 (wherein the inserts 230 further stabilized and center pipe 600), and the final step in FIG. 6C illustrating the engaging of the anvil 410 and secured to the entire hammer 500 assembly, with the walls of conductor pipe 600 shown at a safe offset relative to the interior walls of DDCS 100.

In particular, referring to FIG. 9A, inside of the DDCS apparatus 100 the plurality of inserts 230 are shown in their outward (static) position, as well as the anvil 410 is shown in its low (disengaged) position inside the anvil housing 400 due to the DDCS apparatus 100 being empty as the conductor pipe and connector 600, with PDL 610 with integrated shoulder 620 have yet to be inserted and remain outside and below the DDCS apparatus 100.

Referring to FIG. 9B, the conductor pipe and connector 600, with PDL 610 with integrated load shoulder 620 are shown half-way inserted into the DDCS apparatus 100. Here, a few of the total plurality of inserts 230 which are engaged by the outward protruding PDL 610 load shoulder 620 are shown in their inward (dynamic) position, flexing to allow the PDL 610 load shoulder 620 to pass through the inside the DDCS apparatus 100. The remaining plurality of inserts 230 remain in their outward (static) position maintaining the proper sleeve gap requirements with the flush wall of the conductor pipe and connector 600. The anvil 410 is still shown in its low (disengaged) position inside the anvil housing 400 as the conductor pipe and connector 600 are not yet fully inserted into the DDCS apparatus 100.

Referring to FIG. 9C, the conductor pipe and connector 600, with PDL 610 with integrated load shoulder 620 are shown fully inserted into the DDCS apparatus 100. The PDL 610 integrated load shoulder 620 have traveled past the total plurality of inserts 230. Here, the inserts 230 are shown back in their outward (static) position maintaining the proper sleeve gap requirements with the flush wall of the conductor pipe and connector 600. In addition, the anvil 410 is now shown in its high (engaged) position inside the anvil housing 400 as the conductor pipe and connector 600 are fully inserted into the DDCS apparatus 100. Here, the entire hammer 500 assembly is shown fully and securely engaged with the conductor pipe and connector 600 assembly and operations can commence.

Figure 10A:
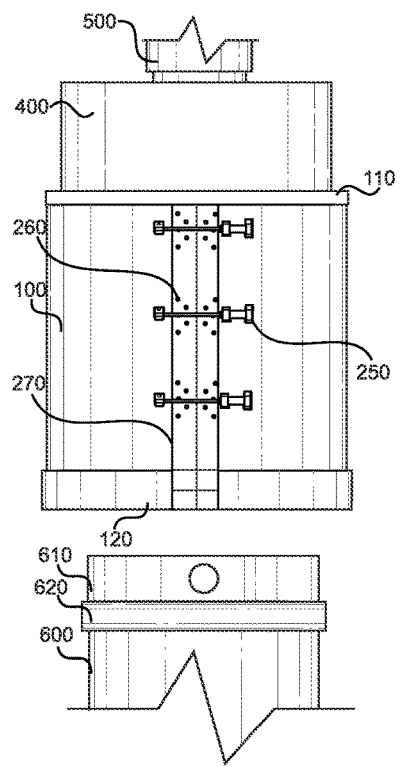
FIGS. 10A-10B illustrate perspective views for the DDCS apparatus of FIG. 5A in one non-limiting exemplary embodiment of a method of operation, wherein the DDCS apparatus is shown attached to a hammer and anvil housing, wherein a conductor pipe, connector and PDL are shown below, passing vertically through the opened body with fixed inserts.
Figure 10B:
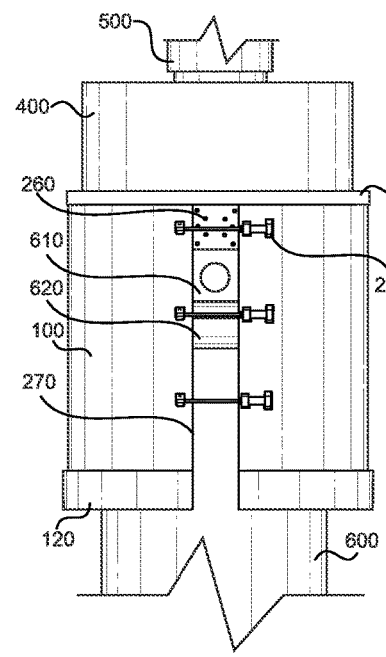
Figure 10C:
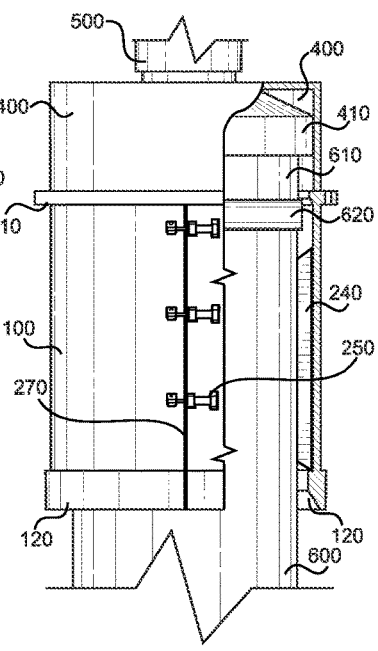
FIG. 10C illustrates a perspective and partial cross-sectional view for the DDCS apparatus of FIG. 5A in one non-limiting exemplary embodiment of a method of operation, wherein the DDCS apparatus is shown attached to a hammer and anvil housing, wherein a conductor pipe, connector and PDL are shown contacted to the anvil and secured to the hammer assembly after being closed.

FIGS. 10A-10C, illustrate one non-limiting exemplary embodiment of a method of operation for the DDCS apparatus 100 of FIGS. 4A-4B. Here, hammer 500 is shown as an assembly connected at its base to the anvil housing 400, wherein housing 300 houses anvil 410, which is then connected at its base to the DDCS apparatus 100 via the fastening connection ring 110. In addition, a conductor pipe and connector 600, with a PDL 610 with integrated shoulder 620 are shown in practical relative sequence of operation. Specifically, the first step shown in FIG. 6A illustrates the pipe 600 before being inserted, the second step in FIG. 6B illustrating the pipe 600 passing vertically through the DDCS apparatus 100 and engaging inserts 240 (wherein the inserts 240 further stabilized and center pipe 600), and the final step in FIG. 6C illustrating the engaging of the anvil 410 and secured to the entire hammer 500 assembly, with the walls of conductor pipe 600 shown at a safe offset relative to the interior walls of DDCS 100.

In particular, referring to FIG. 10A, the DDCS apparatus 100 is shown with a plurality of latches 250 in the open (unset) position where the split 270 body of the DDCS apparatus 100 have pivoted about the hinges 260. The DDCS apparatus 100 being empty as the conductor pipe and connector 600, with PDL 610 with integrated shoulder 620 have yet to be inserted and remain outside and below the DDCS apparatus 100.

Referring to FIG. 10B, the conductor pipe and connector 600, with PDL 610 with integrated load shoulder 620 are shown half-way inserted into the DDCS apparatus 100 with a plurality of latches 250 in the open (unset) position where the split region 270 body of the DDCS apparatus 100 has pivoted open about an axis via hinges 260.

Referring to FIG. 10C, the conductor pipe and connector 600, with PDL 610 with integrated load shoulder 620 are shown fully inserted into the DDCS apparatus 100. Here, the plurality of latches 250 are shown in the closed (set) position where the split 270 body of the DDCS apparatus 100 have pivoted about the hinges 260. The PDL 610 integrated load shoulder 620 have traveled past the total plurality of inserts 240 maintaining the proper sleeve gap requirements with the flush wall of the conductor pipe and connector 600. In addition, the anvil 410 is now shown in its high (engaged) position inside the anvil housing 400 as the conductor pipe and connector 600 are fully inserted into the DDCS apparatus 100. Here, the entire hammer 500 assembly is shown fully and securely engaged with the conductor pipe and connector 600 assembly and operations can commence.

It is contemplated within the scope of the invention that any of the DDCS apparatus 100, with any of the inserts 200, 210, 220, 230, 240, either with or without the addition of a split region 270 of the body of DDCS 100 with hinges 260 and latches 250, can be activated, expanded, contracted, flexed, bulged, or set via various means, methods, or tools, thereby allowing any connector lip, upset, PDL load shoulder 620, or any other non-flush section or raised protrusion/bulge of the connector to pass through the inner section of the DDCS apparatuses 100 assembly and contact the anvil 410 while still maintaining or re-establishing the proper sleeve gap requirements for proper centrality and security with the pile itself below the connector against the conductor pipe 600 wall so that maximum stability, and in effect maximum energy can transfer from the impact piling hammer 500 to anvil 410 to the connector and conductor pipe or pile 600. For example, the moving parts (such as 200, 210, 220, 230, 240, 250, 260) can be activated via combination of gears or a mechanical operation with the use of the activator. Alternatively, the moving parts of the DDCS apparatuses 100 can be activated via an electric motor controlled by a sensor or operator via a controller or remotely. In addition, the parts of the DDCS apparatuses 100 can be activated via hydraulic pressure, fluid pressure, or pressurized source running through or within the DDCS apparatus 100. Further, an electromagnet or magnetic force can also be used to activate the moving parts of the DDCS apparatus 100. In addition, the DDCS apparatuses 100 can also be connected or secured to the anvil housing 400 and/or the hammer 500 via connectors, welding, or any other fastening means.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

The invention claimed is:

1. An impact hammer sleeve for oil and gas conductor pipe operations, comprising:
    a tubular sleeve member having interior and exterior wall regions;
    the tubular sleeve having a first half and a second half, wherein the first half and second half pivot about an axis via a hinge member;
    a plurality of protruding members each comprising a flat exterior surface, wherein the plurality of protruding members are each spaced apart from each other and vertically disposed lengthwise in a radial pattern along the interior wall regions of the tubular sleeve; and
    one or more securement members disposed on the exterior wall region of the tubular sleeve, wherein the tubular sleeve is configured to stabilize a hammer above the tubular sleeve atop the conductor pipe.

2. The sleeve of claim 1, wherein each of the plurality of protruding members comprise a beveled or sloped first and second end.

3. The sleeve of claim 1, wherein the plurality of protruding members are flexible or elastic.

4. The sleeve of claim 1, wherein the plurality of protruding members are rigid.

5. The sleeve of claim 1, wherein the securement members are comprised of one or more latches.

6. A method of installing an impact hammer sleeve for oil and gas conductor pipe operations, comprising:
    lowering a tubular sleeve member, wherein the tubular sleeve member comprises interior and exterior wall regions and having a plurality of protruding members, wherein each of the plurality of protruding member are vertically disposed lengthwise in a radial pattern along the interior wall regions of the tubular sleeve, wherein the tubular sleeve comprises a first half and a second half, and wherein the first half and second half pivot about an axis via a hinge member;
    opening the first half and second half of the tubular sleeve via the hinge member;
    sliding the tubular sleeve over a conductor pipe and connector, wherein the connector, a thread protector lip, or an upset pass therethrough and engage the plurality of protruding members of the tubular sleeve;
    closing the first half and second half of the tubular sleeve via the hinge member; and
    securing the first half and second half of the tubular sleeve via one or more securement members disposed on the exterior wall region of the tubular sleeve, wherein the tubular sleeve is secured below a hammer and above at least a portion of the conductor pipe.

7. The sleeve of claim 6, wherein the plurality of protruding members are flexible or elastic.

8. The sleeve of claim 6, wherein the plurality of protruding members are rigid.

9. The sleeve of claim 6, wherein the one or more securement members are comprised of one or more latches.

* * * * *